US008823329B2

(12) United States Patent
Sloop et al.

(10) Patent No.: US 8,823,329 B2
(45) Date of Patent: Sep. 2, 2014

(54) DISCHARGING OF BATTERIES

(76) Inventors: Steven E. Sloop, Bend, OR (US);
Robert Parker, Bend, OR (US)

(*) Notice: Subject to any disclaimer, the term of this patent is extended or adjusted under 35 U.S.C. 154(b) by 676 days.

(21) Appl. No.: 13/042,329

(22) Filed: Mar. 7, 2011

(65) Prior Publication Data

US 2011/0215766 A1 Sep. 8, 2011

Related U.S. Application Data

(60) Provisional application No. 61/311,087, filed on Mar. 5, 2010.

(51) Int. Cl.
*H02J 7/00* (2006.01)
*H01M 10/48* (2006.01)
*H01M 10/44* (2006.01)
*H01M 2/10* (2006.01)

(52) U.S. Cl.
CPC ........... *H02J 7/0063* (2013.01); *H01M 10/488* (2013.01); *H01M 2200/106* (2013.01); *Y02E 60/12* (2013.01); *H01M 10/441* (2013.01); *H01M 2/1027* (2013.01)
USPC ............................ 320/136; 320/135; 324/426

(58) Field of Classification Search
USPC ........................... 320/136, 135, 112; 324/426
See application file for complete search history.

(56) References Cited

U.S. PATENT DOCUMENTS

| | | | |
|---|---|---|---|
| 4,702,563 A | 10/1987 | Parker | |
| 4,702,564 A | 10/1987 | Parker | |
| 4,726,661 A | 2/1988 | Parker | |
| 5,128,616 A | 7/1992 | Palmer | |
| 5,164,653 A * | 11/1992 | Reem | 320/135 |
| 5,323,652 A * | 6/1994 | Parker | 73/295 |
| 5,841,285 A * | 11/1998 | Bailey | 324/435 |
| 6,369,793 B1 | 4/2002 | Parker | |
| 6,433,514 B1 * | 8/2002 | McClure et al. | 320/136 |
| 6,511,639 B1 | 1/2003 | Schmidt et al. | |
| 6,524,737 B1 | 2/2003 | Tanii et al. | |
| 6,614,205 B2 * | 9/2003 | Nakashimo | 320/134 |
| 6,844,103 B2 | 1/2005 | Lee et al. | |
| 7,586,289 B2 * | 9/2009 | Andruk et al. | 320/112 |
| 7,713,396 B2 | 5/2010 | Kakuta et al. | |
| 2003/0049522 A1 | 3/2003 | Doomernik | |
| 2005/0127871 A1 * | 6/2005 | Orikasa | 320/112 |
| 2010/0247900 A1 * | 9/2010 | Parker et al. | 428/327 |

FOREIGN PATENT DOCUMENTS

JP 2002151164 A 5/2002
JP 2009224202 A 10/2009

OTHER PUBLICATIONS

ISA Korea, International Search Report of PCT/US2011/027441, Nov. 2, 2011, WIPO, 10 pages.

* cited by examiner

*Primary Examiner* — Yalkew Fantu
(74) *Attorney, Agent, or Firm* — Alleman Hall McCoy Russell & Tuttle LLP

(57) ABSTRACT

Embodiments are disclosed that relate to devices for discharging batteries. For example, one disclosed embodiment provides a battery discharge device including a positive battery contact for forming an electrical contact with a positive battery terminal of a battery, a negative battery contact for forming an electrical contact with a negative battery terminal of the battery, and a battery discharge indicator including a resistive heating material in electrical communication with the positive battery contact and with the negative battery contact, and also including a reversible thermochromic indicator in thermal communication with the resistive heating material.

17 Claims, 7 Drawing Sheets

US 8,823,329 B2

DISCHARGING OF BATTERIES

CROSS-REFERENCE TO RELATED APPLICATIONS

This application claims priority to U.S. Provisional Patent Application Ser. No. 61/311,087, titled BATTERY DISCHARGE DEVICE and filed Mar. 5, 2010, the entire disclosure of which is hereby incorporated by reference.

BACKGROUND

Disposal and/or recycling of charged or partially charged batteries may present a serious risk of fire or damage to processing equipment because of the reactive state of the electrolytic chemicals used to store energy within the battery. Some approaches to reduce the risk of fire hazards rely on containing potential explosions. However, such approaches may lead to loss of valuable recyclable materials, exposure of users to hazardous substances, and other consequences that may raise the cost of recycling and inhibit the recovery and reuse of batteries.

SUMMARY

Accordingly, various embodiments are disclosed herein that relate to devices for discharging batteries. For example, one disclosed embodiment provides a battery discharge device including a positive battery contact for forming an electrical contact with a positive battery terminal of a battery, a negative battery contact for forming an electrical contact with a negative battery terminal of the battery, and a battery discharge indicator including a resistive heating material in electrical communication with the positive battery contact and with the negative battery contact, and also including a reversible thermochromic indicator in thermal communication with the resistive heating material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
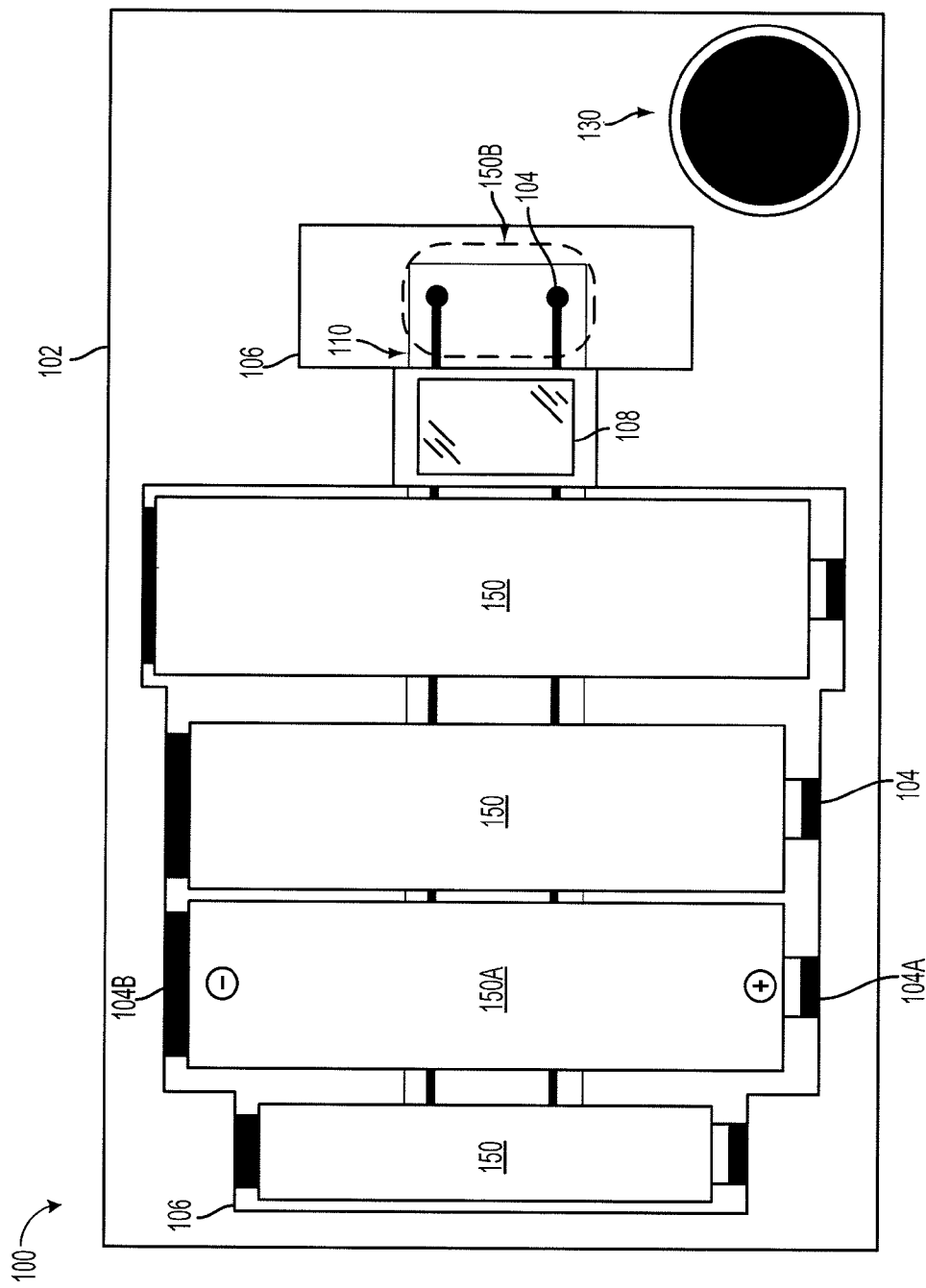
FIG. 1 shows a schematic top view of an embodiment of a battery discharge device.
Figure 2:
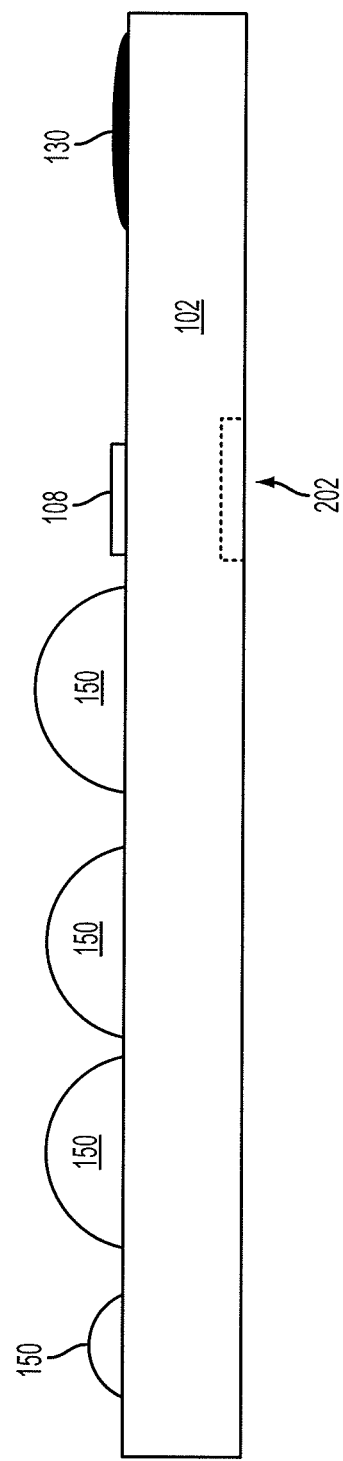
FIG. 2 shows a schematic side view of the battery discharge device of FIG. 1.

FIGS. 1 and 2 show an embodiment of a resistive battery discharge device 100 that may be used to discharge one or more batteries 150. As an overview, battery discharge device 100 comprises a housing 102 and a plurality of battery contacts 104 within a battery receptacle 106 of housing 102. Battery discharge device 100 also includes a battery discharge indicator 108 for indicating a charged/discharged state of one or more batteries 150 being discharged. Each of the components of battery discharge device 100 will be discussed in detail below.

Housing 102 is configured to retain various electrical components of battery discharge device 100. Housing 102 may be formed by any suitable construction. For example, in some embodiments, housing 102 may be vacuum-formed, injection molded, thermoformed, etc.

Housing 102 is configured to include one or more battery receptacles 106, each of which is configured to retain one or more batteries 150 during the discharge process. It will be appreciated that, though FIGS. 1 and 2 depict an embodiment of housing 102 that includes a single battery receptacle 106 configured to accept a plurality of batteries 150 of different sizes, some embodiments of housing 102 may include receptacles configured to accept batteries of a single size, or of a greater or lesser number of sizes than that shown in FIGS. 1-4.

Figure 3:
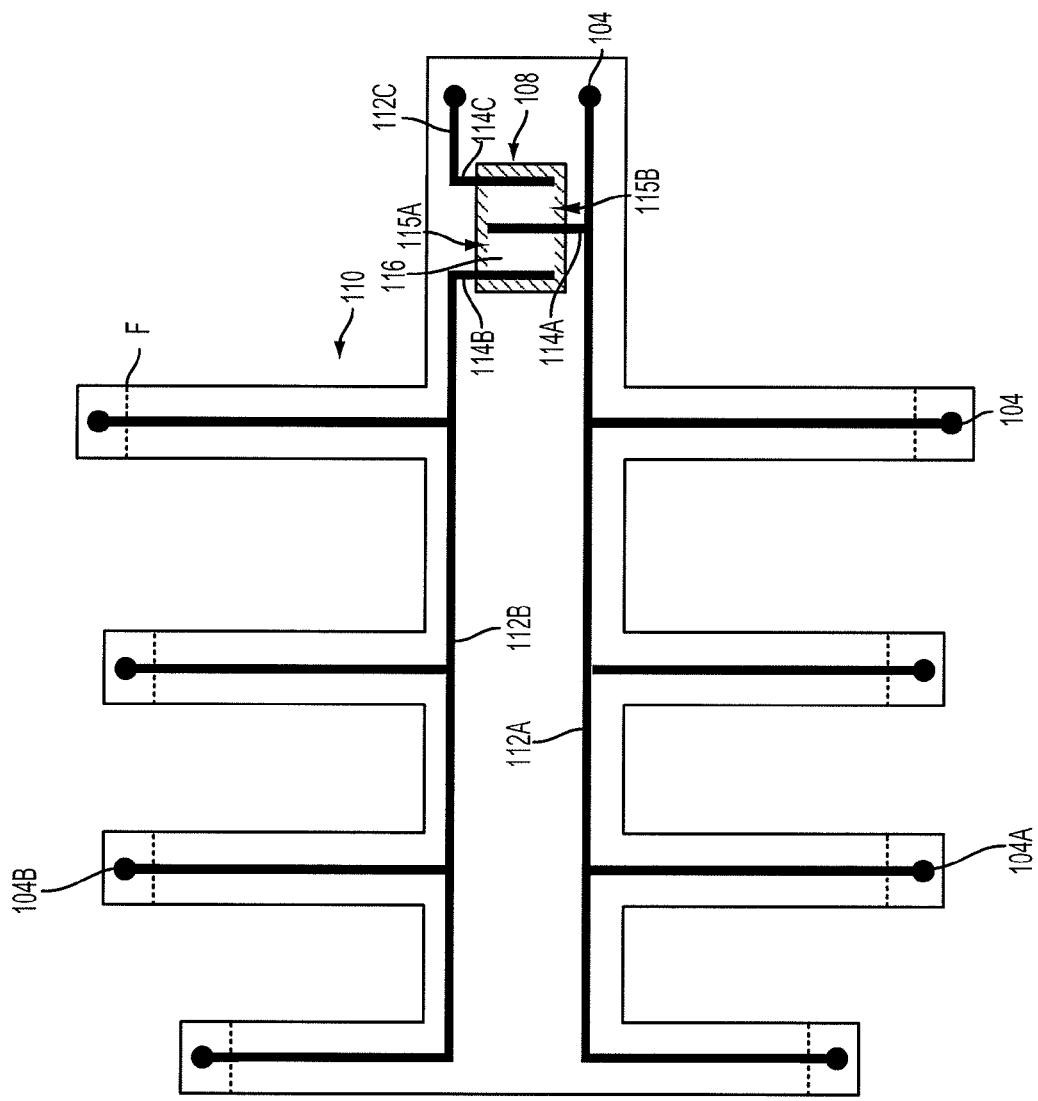
FIG. 3 shows a schematic top view of an embodiment of an insulating substrate insertable into the battery discharge device of FIG. 1.
Figure 4:
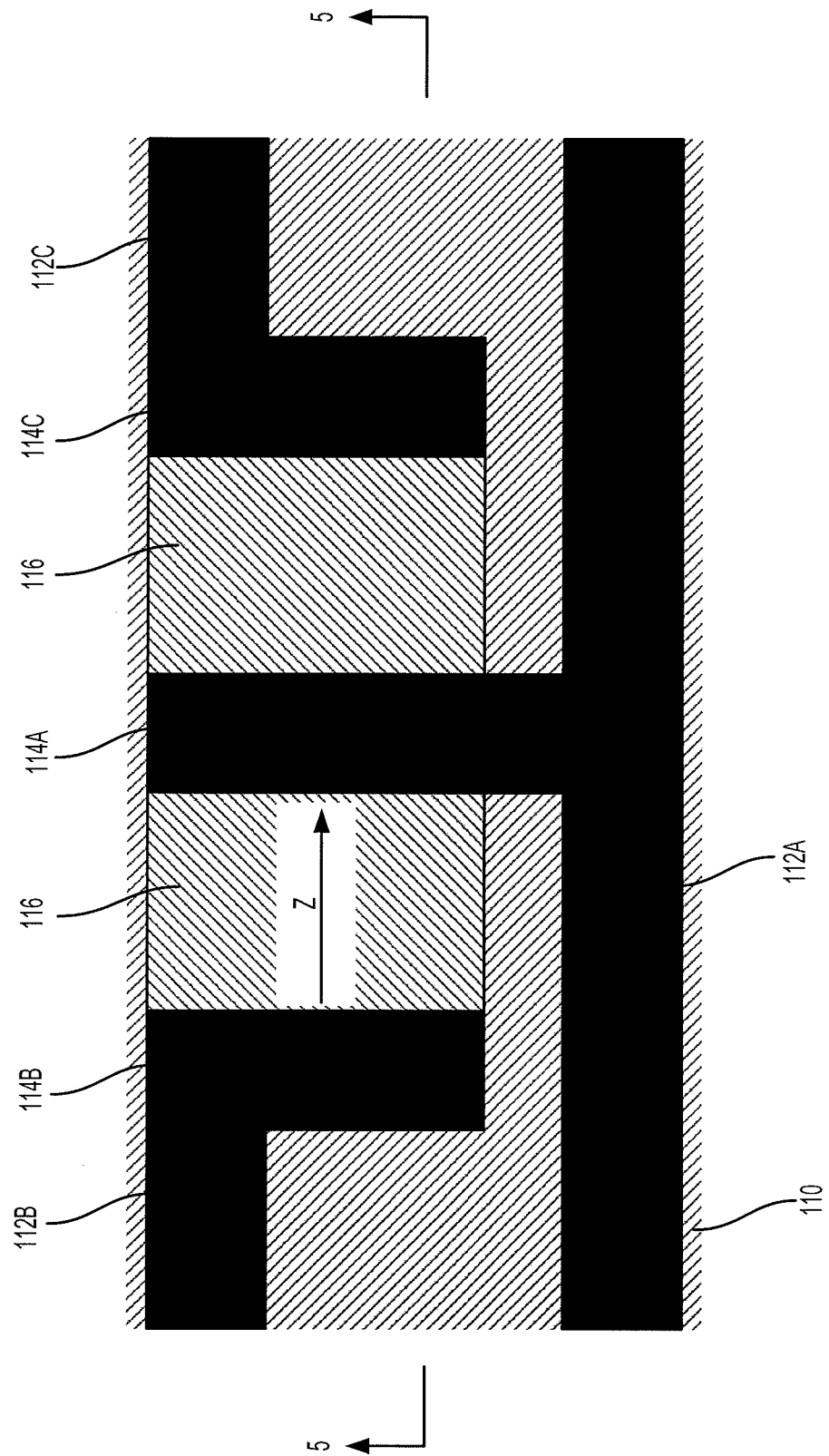
FIG. 4 shows a schematic top view of an embodiment of a resistive heating element for use in a battery discharge device.

In some embodiments, housing 102 may also include an insulating substrate 110 on which some or all of the electrical components of battery discharge device 100 may be arranged. For example, FIG. 3 shows an embodiment of an insulating substrate 110 separately formed from housing 102, on which various electrical components of battery discharge device 100, described in more detail below, are arranged.

In some embodiments, insulating substrate 110 may be formed from a flexible material. Further, in some embodiments, insulating substrate 110 may be die-cut from a suitable flexible insulating material, folded, and inserted into battery receptacle 106. For example, in the example shown in FIG. 3, insulating substrate 110 includes several fold locations (represented by lines F) indicating where insulating substrate 110 may be folded to fit within the battery receptacle 106 of the embodiment shown in FIG. 1. It will be appreciated that in some embodiments, insulating substrate 110 may be directly formed into battery receptacle 106, by a coating process, for example, or by some other suitable method. In some embodiments where battery receptacle 106 is formed from a suitable insulating material, insulating substrate 110 may be omitted and the various electrical components may be arranged directly on surfaces of battery receptacle 106 or housing 102.

In some embodiments, insulating substrate 110 may include a plurality of battery contacts 104, current carriers 112, and/or electrodes 114. For example, in one scenario, battery contacts 104, current carriers 112, and electrodes 114 may be printed on insulating substrate 110 with a conductive material, such as a silver-bearing ink or paint, by a pad printer, an ink jet printer, etc. Additionally or alternatively, in some embodiments, such components may be formed by traditional deposition, lithographic, and etching techniques, by bonding of one or more surface mounted components to insulating substrate 110, any suitable combination thereof, and/or via any other suitable method.

Each of the plurality of battery contacts 104 is configured to provide an electrical connection to a corresponding terminal of a battery 150 according to a polarity of the battery terminal. For example, in FIG. 1, battery contact 104A is shown in electrical contact with a positive terminal of battery 150A, and battery contact 104B is shown in electrical contact with a negative battery terminal of battery 150A. In some embodiments, each battery contact 104 may form an electrical connection to a corresponding battery terminal of battery 150 by a frictional connection. Additionally or alternatively, in some embodiments, each battery contact 104 may be configured to retain a respective battery terminal of battery 150 within battery receptacle 106.

In some embodiments, battery contacts 104 may be located near opposing sides of battery receptacle 106. For example, such a configuration may be used to form an electrical connection to the battery terminals of a cylindrical can-style battery 150A having battery terminals located at each end of battery 150A. Additionally or alternatively, in some embodiments, battery contacts 104 may be located near a same side of battery receptacle 106. For example, such a configuration may be used to form an electrical connection to battery terminals located on one end of a prismatic-style battery 150B (such as a 9-volt battery). It will be appreciated that any suitable configuration of battery contacts 104 may be employed for forming connections with the battery terminals of button-style batteries, camera batteries, laptop batteries, automotive batteries, etc.

Each battery contact 104 is configured to communicate electrically with a corresponding current carrier 112 according to an associated polarity of the corresponding current carrier 112. Further, current carriers 112 of different polarities are configured to be electrically isolated from each other to avoid forming short circuit loops between battery terminals. Electrical isolation may be provided by any suitable isolating material, such as an air gap, a dielectric material, etc. For example, as depicted in FIGS. 1 and 3, current carrier 112A is configured as a positive current carrier, which is in electrical communication with battery contact 104A and the positive battery terminal of battery 150A. Further, current carrier 112B is configured as a negative current carrier in electrical communication with battery contact 104B and the negative battery terminal of battery 150A.

Each current carrier 112 is configured to conduct current from respective battery contact 104 to a respective electrode 114. For example, in FIG. 3, negative current carrier 112B is configured to conduct current from negative battery contact 104B to negative electrode 114B, and positive current carrier 112A is configured to conduct current from positive electrode 114A to positive battery contact 104A. In some embodiments, current carriers 112 may be arranged to discharge plural batteries 150 at one time via connection in series and/or in parallel according to a discharge application.

The electrode 114 of one polarity is separated by one or more electrical gaps 115 from the electrode 114 of opposite polarity. In some embodiments, plural electrical gaps may be employed with multiple electrodes so that an electrode of one polarity may be separated from a plurality of electrodes having an opposite polarity. For example, in FIG. 3, positive electrode 114A is separated from negative electrode 114B by electrical gap 115A and negative electrode 114C is separated from positive electrode 114A by electrical gap 115B. Such an arrangement may provide the beneficial advantage of providing different electrical gaps for different battery sizes. Thus, in one scenario, a portion of the battery discharge device used for a low voltage watch battery might include a differently sized electrical gap from a portion used for high voltage camera flash battery. Some other embodiments may include a single electrode common to all current carriers of a like polarity, wherein the two electrodes are separated by a single electrical gap.

At least a portion of electrical gap 115 is bridged by a resistive heating material 116 so that current passing between two electrodes 114 causes a temperature increase in resistive heating material 116. It will be appreciated that, in some embodiments, an amount and/or geometry of resistive heating material 116 may be configured to achieve a desired discharge rate, throughput, etc. according to a desired number or capacity of batteries 150 to be discharged by battery discharge device 100. For example, in some embodiments, resistive heating material 116 may have a resistance of 2-3 ohms and may be configured to discharge a fully-charged battery in 2-3 hours. In some embodiments, resistive heating material 116 may be configured to have a constant cross-sectional area normal to a direction in which current produced by a battery flows between electrodes 114. This may help to avoid increasing a resistance of the resistive heating material 116 in a direction of current flow. For example, in FIGS. 4 and 5, electrical current passing between electrodes 114B and 114A is depicted as flowing along a direction Z; thus, the cross-sectional area of resistive heating material 116 normal to direction Z is configured to be constant. Such a constant cross-sectional area may beneficially enhance a current distribution along direction Z, which may result in an even heat generation by resistive heating material 116. In one example, resistive heating material 116 may be configured as a line approximately 0.25 inches wide and 0.1 inches thick. In some other embodiments, the cross-section of the resistive heating material 116 may have any other suitable dimensions.

In some embodiments, battery discharge device 100 may include plural segments of resistive heating materials 116, which may optionally be sized and arranged according to an associated battery type to be discharged by the respective resistive heating material 116. In some other embodiments, battery discharge device 100 may include a single, common segment of resistive heating material 116.

In some embodiments, resistive heating material 116 may include a positive thermal coefficient (PTC) material. A PTC material may be any suitable material configured to experience an increase in electrical resistance as a temperature of the PTC material increases. One example of a PTC material is a carbon-based ink that may be applied by a suitable printing technique. Thus, it will be appreciated that a temperature of resistive heating material 116 may be beneficially self-limiting under electrical load, potentially avoiding overheating or damage to battery discharge device 100. For example, in some embodiments, a PTC material may self-limit within an operating temperature range of between 60° C. and 70° C. Some embodiments using a PTC material may be configured so that the resistive heating material 116 will achieve operating temperature rapidly to aid throughput performance.

Optionally, a portion of insulating substrate 110 including resistive heating material 116 may be suspended in housing 102 to form an air gap beneath resistive heating material 116, and housing 102 may include an opening (die-cut opening 202, for example) surrounding resistive heating material 116, which may beneficially increase heat transfer away from resistive heating material 116. Such approaches may provide additional protection from thermal damage. Further, such embodiments may reduce a thermal mass to be heated during the discharge process, which may beneficially reduce a transition time for resistive heating material 116 to achieve an operating temperature.

Resistive heating material 116 is in thermal communication with battery discharge indicator 108. Battery discharge indicator 108 is configured to provide a visual indication of a charged/discharged state of one or more batteries 150 during the discharge process. Battery discharge indicator 108 includes a contrast image and a reversible thermochromic indicator 504 in thermal communication with resistive heating material 116.

Figure 5:
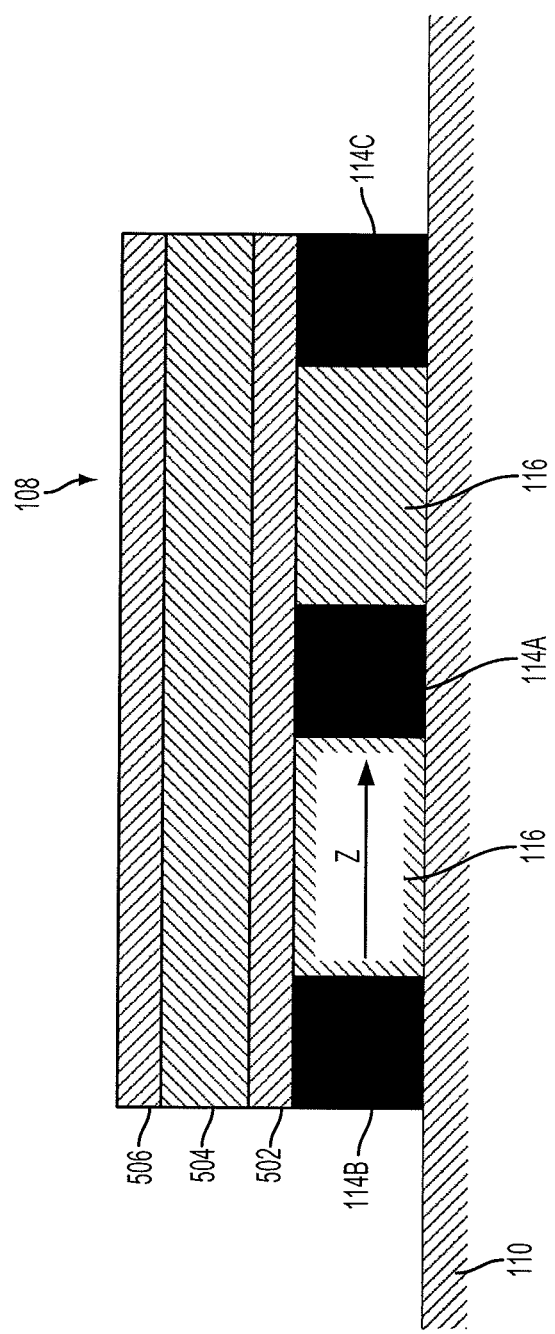
FIG. 5 shows a schematic sectional view along line 5-5 of the embodiment of the resistive heating element of FIG. 4.
Figure 6:
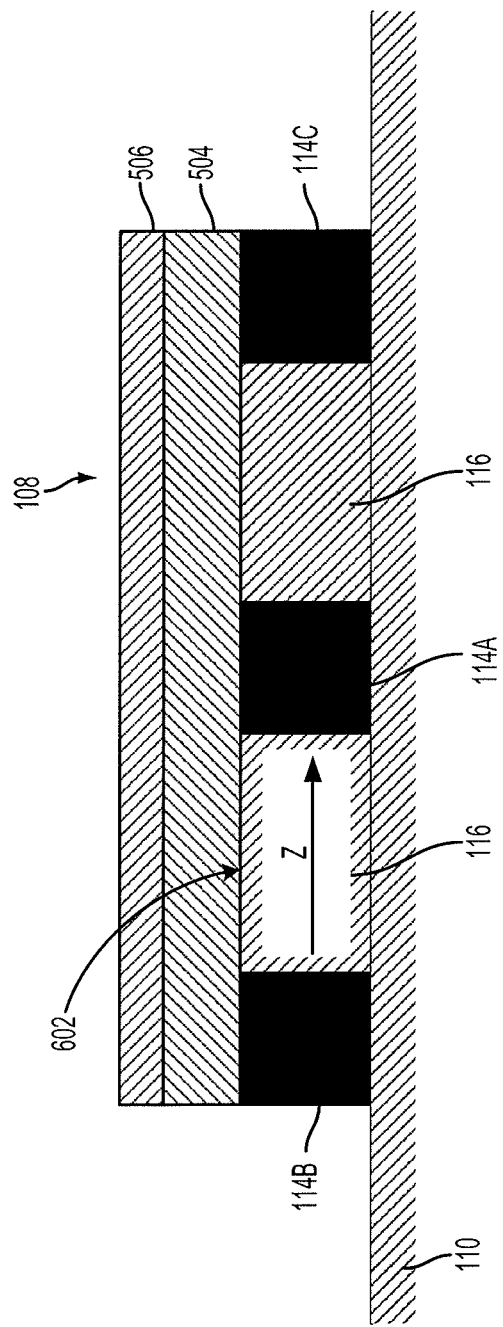
FIG. 6 shows a schematic sectional view of another embodiment of a resistive heating element.

The contrast image is configured to provide a visual reference background for thermochromic indicator 504. For example, the contrast image may be a color block or a combination of color blocks (such as red, yellow, white, etc.), a logo, text, etc. The contrast image may be arranged between resistive heating material 116 and thermochromic indicator 504 in any suitable manner. In some embodiments, such as shown in FIG. 5, the contrast image may have the form of a contrast layer 502 disposed between resistive heating material 116 and thermochromic indicator 504, such as a contrast image printed, adhered, or deposited on the top surface of resistive heating material 116. In some other embodiments, such as shown in FIG. 6, the contrast image may be formed by a contrasting surface 602 of resistive heating material 116.

Reversible thermochromic indicator 504 is configured to include a thermochromic material exhibiting a reversible color change on heating or cooling. Example reversible thermochromic materials include leuco dyes and liquid crystal dyes. Accordingly, in some embodiments, reversible thermochromic indicator 504 may be printed and/or painted on a top surface of resistive heating material 116.

Some embodiments of reversible thermochromic indicator 504 may be configured to transition from an opaque color (for example, black) below a transition temperature of reversible thermochromic indicator 504 to a visibly transparent or translucent water-white color above the transition temperature of reversible thermochromic indicator 504. In some embodiments, the transition temperature may be in the range of 45° C. to 47° C. Thus, the reversible thermochromic indicator may be configured to be visibly transparent at a first, lower temperature that is below the transition temperature, and visibly colored at a second, higher temperature that is above the transition temperature.

Thus, in a first scenario where a battery 150 is being discharged, current flow induced by battery 150 induces heating of resistive heating material 116 to a temperature above the transition temperature of reversible thermochromic indicator 504 so that the contrast image is visible through thermochromic indicator 504.

In a second scenario, when the battery is in a discharged state and when resistive heating material 116 has cooled to a temperature below the transition temperature of reversible thermochromic indicator 504 so that the contrast image is obscured by the opaque color of reversible thermochromic indicator 504.

In some embodiments, battery discharge indicator 108 may include a protective screen layer 506 configured to protect reversible thermochromic indicator 504 from contact damage and/or to protect users from heat transmitted through reversible thermochromic indicator 504. In some embodiments, protective screen layer 506 may be configured as a portion of housing 102, as a magnifying structure to magnify optically the contrast image, etc.

Optionally, housing 102 may include an ink marking station 130, which may be used to mark a discharged battery upon completion of the discharge process so that processed batteries may be distinguished from batteries not yet processed.

Figure 7:
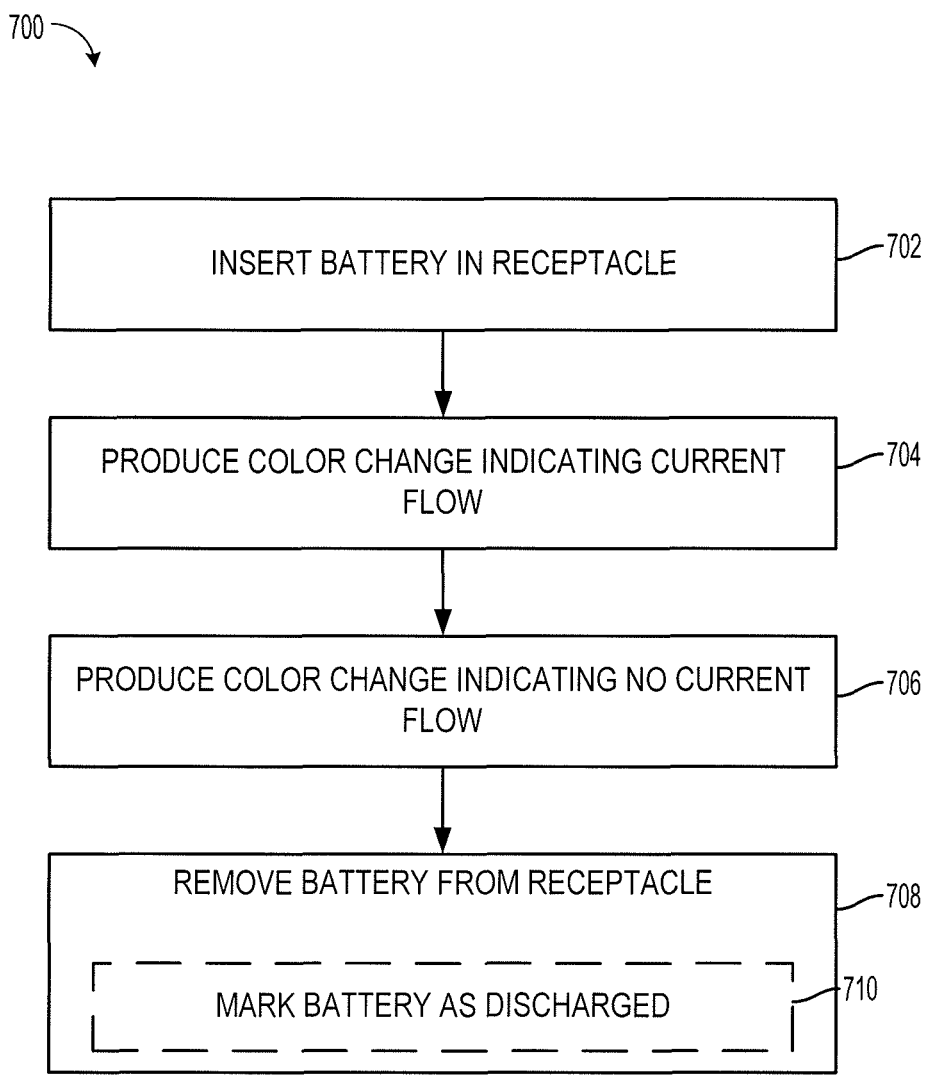
FIG. 7 shows a flowchart of an embodiment of a method for discharging a battery.

FIG. 7 shows a method 700 of operating a battery discharge device. It will be appreciated that method 700 may be performed by any suitable resistive battery discharge device hardware, and is not limited to the above-described embodiments.

At 702, a battery is inserted into a battery receptacle for discharge processing. Insertion of the battery causes the terminals of the battery to be placed in contact with corresponding battery contacts of the battery discharge device. If the battery contains a sufficient charge to energize the resistive heating material of the battery discharge device, a color change indicating current flow in the battery discharge indicator will occur at 704. In some embodiments, the color indicating current flow may be the formed by the contrast image that is made visible through the reversible thermochromic indicator.

Once the battery reaches a discharged state, the resistive heating material becomes de-energized. Once the temperature of the reversible thermochromic indicator falls below the transition temperature of the reversible thermochromic indicator, a color change indicating no current flow in the battery discharge indicator will occur at 706. In some embodiments, the contrast image may be obscured by the reversible thermochromic indicator, so that the color observed is the native, opaque color of the reversible thermochromic indicator.

Upon observing the color indicating no current flow, at 708, the discharged battery is removed from the battery discharge device. In some embodiments, 708 may include, at 710, marking the discharged battery as discharged.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A battery discharge device, comprising: one or more battery receptacles to removably retain one or more batteries during a discharge process, each battery receptacle comprising a positive battery contact for forming an electrical contact with a positive battery terminal of a battery; and a negative battery contact for forming an electrical contact with a negative battery terminal of the battery; and a battery discharge indicator including; a resistive heating material in electrical communication with the positive battery contact and with the negative battery contact of each battery receptacle, and a reversible thermochromic indicator in thermal communication with the resistive heating material; and wherein the resistive heating material comprises a positive thermal coefficient carbon-based ink printed on a surface of an insulating substrate.

2. The battery discharge device of claim 1, wherein the battery discharge indicator further comprises a plurality of receptacles configured to hold a corresponding plurality of batteries for discharge, the plurality of receptacles each being in electrical communication with the resistive heating material.

3. The battery discharge device of claim 1, wherein the resistive heating material is located in a plurality of gaps between a plurality of electrodes, and wherein two or more gaps have different sizes based upon batteries to be discharged by circuits including the gaps.

4. The battery discharge device of claim 1, wherein the positive electrode and the negative electrode are printed with an electrically conductive ink on a surface of an insulating substrate.

5. The battery discharge device of claim 1, wherein the reversible thermochromic indicator is configured to be visibly transparent at a first, lower temperature and visibly colored at a second, higher temperature.

6. The battery discharge device of claim 5, wherein the reversible thermochromic indicator is printed on a surface of the resistive heating material.

7. The resistive battery discharge device of claim 1, further comprising a vacuum-formed housing including a die-cut opening surrounding the resistive heating material.

8. The resistive battery discharge device of claim 7, wherein the resistive battery discharge device is configured to discharge a fully charged battery in three hours or less.

9. A resistive battery discharge device for discharging batteries, comprising: a positive battery contact for forming an electrical contact with a positive battery terminal of a battery; a negative battery contact for forming an electrical contact with a negative battery terminal of the battery; a positive electrode in electrical communication with the positive battery contact; a negative electrode in electrical communication with the negative battery contact; a resistive heating material electrically bridging a portion of an electrical gap separating the positive electrode from the negative electrode, the resistive heating material having a constant cross-sectional area normal to a direction of an electrical current flow produced by the battery between the negative electrode and the positive electrode; and a battery discharge indicator in thermal communication with the resistive heating material, the battery discharge indicator including a reversible thermochromic indicator, wherein the resistive battery discharge device is configured to discharge a fully charged battery in three hours or less; wherein the resistive heating material is a positive thermal coefficient carbon-based ink printed on a surface of an insulating substrate.

10. The resistive battery discharge device of claim 9, wherein the resistive heating material comprises a resistance of 3 ohms or less.

11. The resistive battery discharge device of claim 9, wherein a plurality of receptacles are included to hold a corresponding plurality of batteries for discharge, the plurality of receptacles each being in electrical communication with the resistive heating material.

12. The resistive battery discharge device of claim 11, wherein the resistive heating material is located in a plurality of gaps between a plurality of electrodes, and wherein two or more gaps have different sizes based upon batteries to be discharged by circuits including the gaps.

13. The resistive battery discharge device of claim 9, wherein the reversible thermochromic indicator is configured to be visibly transparent at a first, lower temperature and visibly colored at a second, higher temperature.

14. The resistive battery discharge device of claim 13, wherein the reversible thermochromic indicator is printed on a surface of the resistive heating material.

15. The resistive battery discharge device of claim 9, further comprising a vacuum-formed housing including a die-cut opening surrounding the resistive heating material.

16. The resistive battery discharge device of claim 9, further comprising a contrast layer located between the resistive heating material and the reversible thermochromic indicator.

17. A method of discharging a battery with a resistive battery discharge device, the method comprising: inserting a plurality of batteries into a corresponding plurality of battery receptacles of the resistive battery discharge device; discharging the batteries via the resistive battery discharge device to heat a reversible thermochromic material in the battery discharge device to thereby produce a color indicating a current flow produced by the batteries; and removing the batteries from the battery receptacles after color indicating current flow has changed to indicate a lesser current flow from the batteries, and further comprising marking the batteries as discharged after removing the batteries from the resistive battery discharge device.

\* \* \* \* \*